United States Patent [19]

Horigane

[11] Patent Number: 6,098,410
[45] Date of Patent: Aug. 8, 2000

[54] FROZEN OR FREEZE-DRIED PRODUCT, PROCESS AND APPARATUS FOR PRODUCING THE SAME

[75] Inventor: Akira Horigane, 16-520-201, Matsushiro 5-Chome, Tsukuba-shi, Ibaraki 305-0035, Japan

[73] Assignees: Akira Horigane; Director General of National Agriculture Research Center, Ministry of Agriculture, Forestry and Fisheries, both of Tsukuba, Japan

[21] Appl. No.: 09/131,071

[22] Filed: Aug. 7, 1998

[30] Foreign Application Priority Data

Nov. 19, 1997 [JP] Japan .................................... 9-318744

[51] Int. Cl.[7] ............................. F25D 25/00; F25D 3/02; F24F 3/16; A23B 4/03
[52] U.S. Cl. .................................... 62/62; 62/78; 62/379; 426/444
[58] Field of Search ................................. 62/62, 63, 78, 62/378, 379; 425/202; 426/565, 444

[56] References Cited

U.S. PATENT DOCUMENTS

| | | | |
|---|---|---|---|
| 3,958,031 | 5/1976 | Fleck et al. ............................. | 426/579 |
| 4,265,921 | 5/1981 | Lermuzeaux ............................. | 426/444 |
| 4,428,971 | 1/1984 | Havette et al. ........................ | 426/565 |
| 4,668,561 | 5/1987 | Ney ........................................ | 425/202 |
| 5,787,716 | 8/1998 | Allen ........................................... | 62/63 |

FOREIGN PATENT DOCUMENTS

| | | |
|---|---|---|
| 53-139749 | 12/1978 | Japan . |
| 7-250663 | 10/1995 | Japan . |
| 9-98727 | 4/1997 | Japan . |

*Primary Examiner*—William Doerrler
*Attorney, Agent, or Firm*—Flynn, Thiel, Boutell & Tanis, P.C.

[57] ABSTRACT

A process and apparatus for producing a frozen product or a freeze-dried product therefrom of, in particular, a material susceptible to denaturing due to existing enzymes, oxygen and heat, such as living organisms, organic compounds, vegetables, foods, fruits, drugs, biological samples, fodders and industrial raw materials while preserving the original qualities and properties, by recourse to a technique including the steps of mixing and crushing the material to be processed together with dry ice to thereby attain freezing of the material while replacing of the surrounding atmosphere by the thereby liberated carbon dioxide gas.

8 Claims, 4 Drawing Sheets

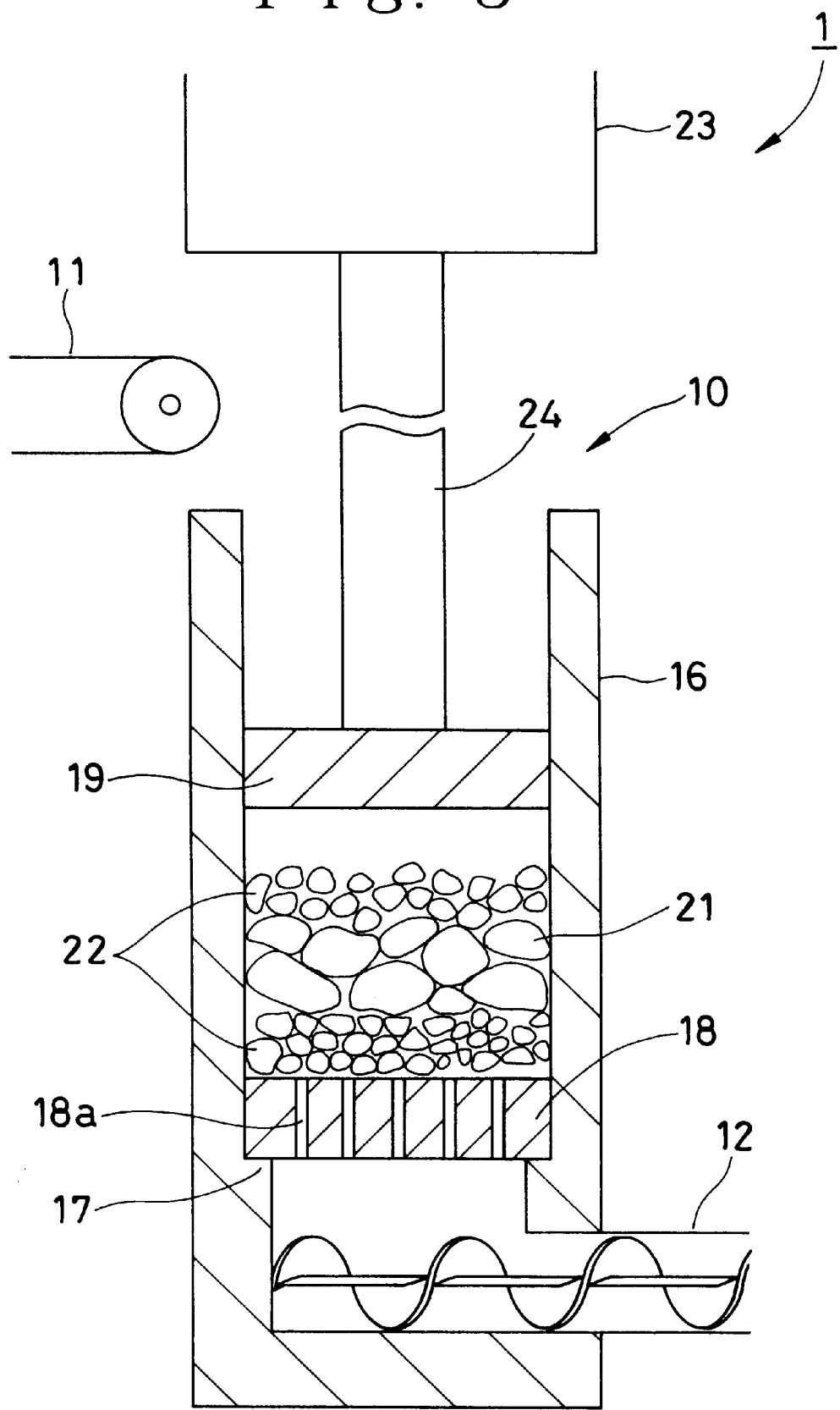

FROZEN OR FREEZE-DRIED PRODUCT, PROCESS AND APPARATUS FOR PRODUCING THE SAME

FIELD OF THE INVENTION

The present invention relates to a process for producing a frozen product or a freeze-dried product, especially of a material susceptible to denaturing, such as a living organism, organic material, food, drug, biological sample, feed or industrial raw material, a frozen or freeze-dried product obtained by such a process and an apparatus for producing such a frozen or freeze-dried product.

BACKGROUND OF THE INVENTION

For storing, transporting and bringing into practical use of materials susceptible to denaturing, such as living organisms, organic materials, foods, drugs, biological samples, feeds and industrial raw materials, they are often processed into a frozen or freeze-dried product. For example, for analyzing a biological material, a sample is prepared by a series of operations for processing the material, such as freezing, drying, crushing and homogenizing.

Freezing may generally be realized using a refrigerator. Here, it takes a relatively prolonged period of time till the freezing temperature is reached, during which the material to be processed may suffer from denaturation due to the presence of oxygen and/or enzymes. Even after the freezing has been completed the, stability during storage may not always be satisfactory because of the presence of oxygen.

Freeze-drying may often be practiced after the material to be processed has preliminarily been treated by crushing and homogenization. Such a crushing operation may cause a temperature elevation of the material due to heat evolution upon crushing. The material may suffer from denaturing due to such a temperature elevation in combination with the presence of oxygen, so that the procedures of crushing, homogenization and freezing are not able to realize the preservation of the original quality and condition of the material.

For eliminating such difficulties, it has been in practised to cool the crusher and homogenizer or, in addition, to exclude any contact of the material under treatment with oxygen. However, such countermeasures require large and complicated arrangements and, were not satisfactory for the contemplated prevention of denaturing of the treated material due to inefficiency of cooling and lack of oxygen elimination.

This has been shown, as widely been recognized in the commercial field of, for example, dry foods, such as dried vegetables etc., convenience foods and the like, by the fact that the taste, color and material condition of such treated articles are debased or deteriorated, resulting in a decrease in the merchandise value and, in the case of the analysis of a sample, biasing the analytical results. Some food products, in particular, vegetables may be pretreated by so-called blunting for deactivation of the enzymes therein by heat treatment before being frozen, wherein, however, denaturing may often occur.

SUMMARY OF THE INVENTION

An object of the present invention is to provide a frozen product of a material in a crushed and homogenized state while preserving the intrinsic quality and properties of the original material without suffering from the denaturing of the material due to the action of oxygen, heat and so on.

Another object of the present invention is to provide a process for producing a frozen product of a material in a crushed and homogenized state while preserving the intrinsic quality and properties of the original material using a simple apparatus in an efficient manner while preventing the denaturing of the material due to the action of oxygen, heat and so on during the process.

A further object of the present invention is to provide an apparatus for realizing the above-mentioned process for producing the frozen product, which has a simple construction and can produce the frozen product with a simple operation.

A still further object of the present invention is to provide a freeze-dried product of a material in a crushed and homogenized state while preserving the intrinsic quality and properties of the original material without suffering from denaturing of the material due to the action of oxygen, heat and so on.

A still further object of the present invention is to provide a process for producing a freeze-dried product of a material in a crushed and homogenized state while preserving the intrinsic quality and properties of the original material using a simple apparatus in an efficient manner while preventing the denaturing of the material due to the action of oxygen, heat and so on during the process.

A still further object of the present invention is to provide an apparatus for realizing the above-mentioned process for producing the freeze-dried product, which has a simple construction and can produce the freeze-dried product by a simple operation.

The above objects are achieved by the frozen or freeze-dried product, process and apparatus therefor according to the present invention.

Thus, the present invention consists in the following frozen or freeze-dried product, process and apparatus:

1) A frozen product obtained by a process comprising mixing and crushing a material to be processed, together with dry ice, to thereby attain freezing of the material while replacing the surrounding atmosphere by the thereby liberated carbon dioxide gas.

2) A porous freeze-dried product obtained by a process comprising mixing and crushing a material to be processed, together with dry ice, to form a frozen blend containing finely disintegrated dry ice particles dispersed therein while replacing the surrounding atmosphere by the thereby liberated carbon dioxide gas and subjecting the frozen blend to vacuum drying.

3) A process for producing a frozen product, comprising mixing and crushing a material to be processed, together with dry ice, to thereby attain freezing of the material while replacing the surrounding atmosphere by the thereby liberated carbon dioxide gas.

4) A process for producing a freeze-dried product, comprising mixing and crushing a material to be processed, together with dry ice, to thereby form a frozen blend containing finely disintegrated dry ice particles dispersed therein, while replacing the surrounding atmosphere by the thereby liberated carbon dioxide gas, and subjecting the frozen blend to vacuum drying.

5) An apparatus for producing a frozen product comprising
   a mixer-crusher in which a material to be processed is mixed and crushed together with dry ice, to form a frozen blend containing finely disintegrated dry ice particles dispersed therein while replacing the surrounding atmosphere by the thereby liberated carbon dioxide gas, a feedstock supplying means for supplying the material to be processed and dry ice to the mixer-crusher and a means for taking out the frozen blend from the mixer-crusher.

6) An apparatus as defined in above 5), wherein the mixer-crusher comprises a cylinder provided with a baffling means and defining therein a working chamber, a screw capable of rotating within the working chamber in the cylinder and designed so as to mix and crush the material to be processed together with dry ice and to forward the mixture towards the discharge end of the cylinder, a rotatable cutter means disposed at the discharge end of the screw and adapted for further crushing of the mixture before discharging it out of the cylinder, a die with extrusion passage(s) disposed at the discharge end of the working chamber subsequent to and in cooperation with the cutter means for permitting extrusion of the frozen blend therethrough.

7) An apparatus as defined in above 5), wherein the mixer-crusher comprises a casing defining therein a working chamber, a die arranged in the casing and a ram crusher adapted for mixing and crushing the material to be processed together with dry ice between the die and a ram top slidable in the working chamber.

8) An apparatus as defined in above 5), wherein the mixer-crusher comprises a casing delimiting therein a working chamber, a die with extrusion passage(s) disposed at the discharge end of the working chamber in the casing and a ram crusher adapted for mixing and crushing the material to be processed together with dry ice between the die and a slidable ram top in the working chamber and extruding the resulting frozen blend through the passage(s) of the die.

9) An apparatus for producing a freeze-dried product of a material susceptible to denaturing, comprising a mixer-crusher in which a material to be processed is mixed and crushed together with dry ice, to form a frozen blend containing finely disintegrated dry ice particles dispersed therein, while replacing the surrounding atmosphere by the thereby liberated carbon dioxide gas, a feedstock supplying means for supplying the material and dry ice to the mixer-crusher, a means for taking out the frozen blend from the mixer-crusher and an apparatus for vacuum-drying the frozen blend obtained in the mixer-crusher.

BRIEF DESCRIPTION OF THE DRAWINGS

FIG. 5 shows a further embodiment of a freezing apparatus according to the present invention in a vertical sectional view.

DETAILED DESCRIPTION OF THE INVENTION

Figure 1:
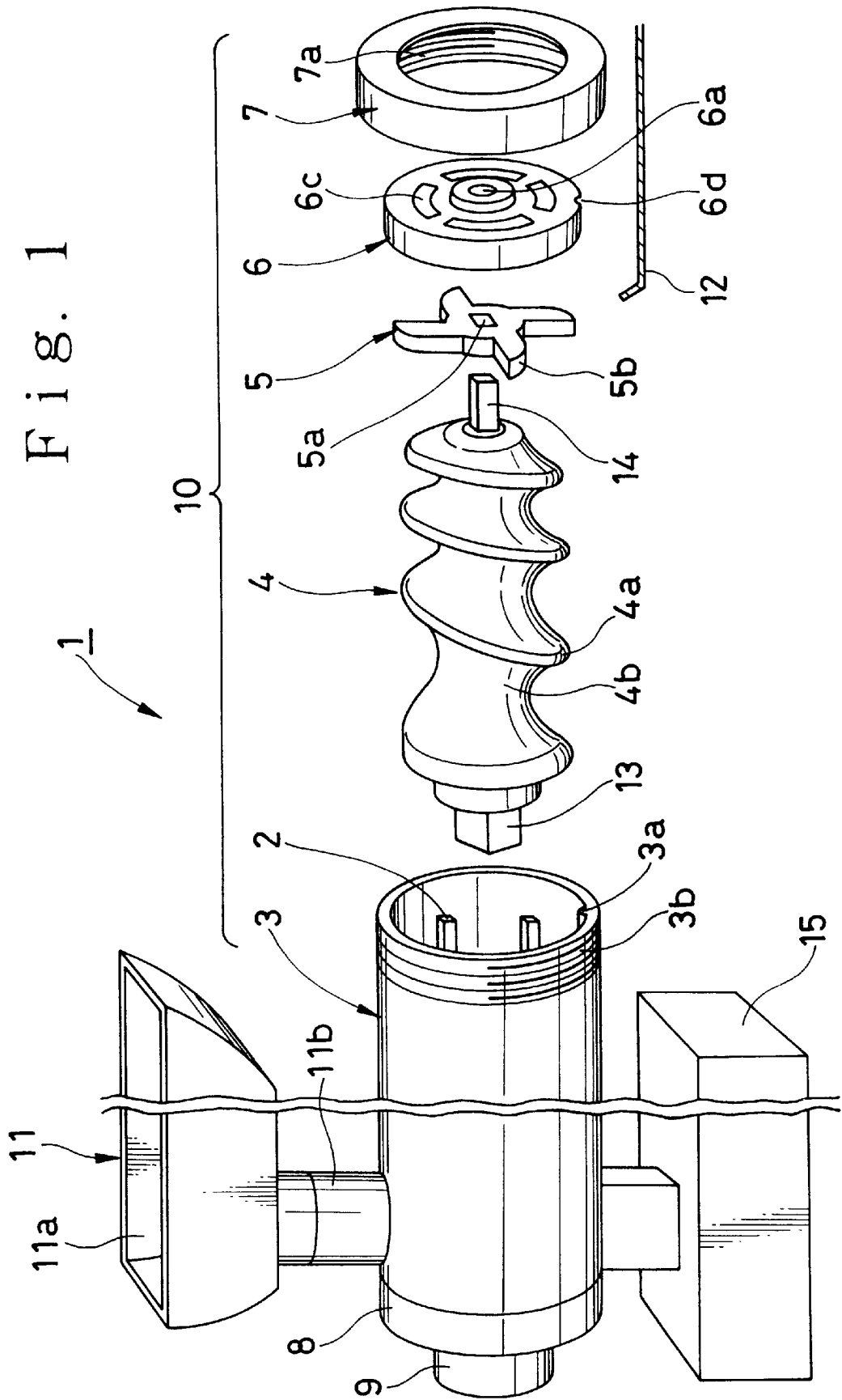
FIG. 1 shows an embodiment of a freezing apparatus according to the present invention in an exploded view.

The material to be processed by the process and apparatus according to the present invention includes organisms, organic materials, foods, drugs, biological samples, fodders and industrial products, in particular, those which are susceptible to denaturing by the action of oxygen, enzymes, heat and so on, especially those containing organic material having labile chemical groups, such as oxidizable functional groups. The material may be present in any voluntary form, such as a lumpy mass, liquid, jelly or slurry, including a crushed or pulverized form. Typical materials may have a considerable content of moisture, though dried materials may be included when they are to be processed, e.g. homogenized, together with fumid materials.

The above exemplification is a mere enumeration of the possible materials to be processed by the process and apparatus according to the present invention. As organisms a, whole body or a part (a tissue) of an individual animal or plant may be dealt with. As organic materials, not only the above organisms, but also those organic substances derived from these organisms may be dealt with. The foods and feeds consist mainly of organic matters, while they may contain inorganic materials. The drugs and industrial materials may, in general, be those containing organisms and/or organic materials, while inorganic materials which are susceptible to denaturing may be processed by the process and apparatus according to the present invention. The biological samples may, in general, be analysis samples consisting of organisms, though other samples may also be dealt with.

Dry ice may be a compacted product of solid carbon dioxide which sublimates at −78.5° C. under atmospheric pressure. Any commercial product sold as a coolant or freezing agent may be used. The dry ice product can be crushed easily by applying a compressive force thereto in the mixer-crusher of the apparatus according to the present invention and, thus, it can be incorporated in the apparatus according to the present invention as a commercial lumpy mass of chosen form and size as such, wherein, however, a product having sizes of 1–5 cm may be preferable. The amount of dry ice to be used may vary depending on the kind, moisture content, consistency and so on of the material to be processed, while it may in general range from 0.01 to 100 parts, preferably from 0.1 to 10 parts by weight per one part by weight of the material to be processed.

In the process according to the present invention, the material to be processed is crushed and mixed together with dry ice in the mixer-crusher of the apparatus according to the present invention, wherein the material is frozen and the thereby liberated carbon dioxide gas will sweep off the surrounding atmosphere to replace it therewith and exclude oxygen. Here, dry ice is crushed easily in the mixer-crusher into fine particles which are mixed therein with the frozen and crushed material to be processed and cool quickly while liberating carbon dioxide gas by endothermic sublimation by heat exchange with the frozen material and establishing an inert gas atmosphere surrounding the frozen material.

When the material to be processed is present as a lumpy mass, it is crushed before, after and even during the freezing. Even when it is crushed before freezing, it freezes instantaneously after it is crushed. In the case where the material to be processed is present as a liquid, jelly or slurry, freezing will start from the surfaces exposed to the external atmosphere or portions contacting with dry ice particles and propagates then to the exposed liquid layer on the face of the frozen and crushed particles upon contact with dry ice particles. These processes proceed within a short period of time, so that freezing of the material occurs as a whole substantially instantaneously. Here, not only a fine crushing into a powdery state but also a rough crushing with the remaining interconnected lumps may be permitted.

In this manner, the material to be processed and dry ice are crushed and mixed within a quite short period of time and, hence, the external atmosphere surrounding the material is replaced by the liberated carbon dioxide gas with the simultaneous freezing of the material, whereby the enzymes contained in the material will be deactivated all of a sudden. Therefore, the material to be processed can be frozen without denaturing and be mixed and crushed into a homogenized and frozen state. In this manner, the resulting frozen material retains all the components, taste, color and other properties of the original material as such. By selecting the conditions of crushing and mixing, the particle size of the frozen product can adequately be selected. The heat developed upon the crushing can be compensated at once by the endothermic sublimation of dry ice without any facilitation of denaturing of the material and, rather, can favorably establish an inert gas atmosphere around the frozen material by the evolution of carbon dioxide gas to sweep away the oxygen.

The so-obtained frozen product can be stored, transported or served for final uses as such, wherein the crushed or homogenized product after thawing has the components, taste, color and other properties intrinsic to the original material. For example, a crushed and frozen product of a fruit can be served directly as a food or as a raw material for foods or can be used as an analytical sample, after having been thawed.

When a crude or roughly processed food is processed by the process and apparatus according to the present invention, a food product exhibiting superior taste and soft mouth feel can be obtained by attaining disintegration of fibrous roughages. The resulting frozen product can maintain its inert condition due to the presence of carbon dioxide gas in a concentrated state over the surfaces thereof.

The frozen product according to the present invention can be used not only in the frozen state as such, but also can be processed further by freeze-drying by subjecting the frozen product to a vacuum freezing in order to obtain a freeze-dried product which can be stored, transported or served as such for final uses. When the frozen product obtained as above is held under vacuum by introducing it into a vacuum drying apparatus, the therein contained dry ice and moisture are subjected to sublimation, whereby a freeze-drying can be realized. The degree of vacuum in the vacuum freezing may be in the range from 10 to $500 \times 10^{-3}$ MBar, preferably from 10 to $50 \times 10^{-3}$ MBar. Here also, the drying is realized without passing through liquid phase, so that there is no danger of the occurrence of denaturing of the material to be processed. The drying is attained by the sublimation of ice from a porous frozen product resulting from the precedingly occurring sublimation of dry ice, so that the efficiency of vacuum drying is high, whereby the drying can be attained within a reduced period of time.

The so-obtained freeze-dried product is present, similarly to the frozen product, as a crushed mass retaining the original components, taste, color, perfume and other properties and can be served as a commercial product after, if necessary, being subjected to a further crushing. The freeze-dried product is obtained in a condition without contact with oxygen and can be stored, transported or served for final use in the inert state as such, though the occurrence of denaturing may be scarce for a freeze-dried product when brought into contact with air during storage, transportation or use, so long as it is not humidified.

Any material can be processed by the process for freeze-drying according to the present invention and specific examples therefor include foods, such as vegetables, fruits, meats and dairy products; drugs, such as crude drugs derived from organisms; organisms; analytical samples, such as those in which organic individuals or tissues are treated by homogenization; bacteria cells, such as yeast and inoculums of bacteria; and industrial raw materials, such as dough for bread, starches and proteins. The bacterial cells are available in an inert state as a living organism. Yeast and dough can be brought into proliferation by fermenting by adding water thereto. Thus, it may be possible to provide a vaccine using a freeze-dried product according to the present invention which is obtained from a plant infected with an attenuated virus.

As the apparatus for carrying out the freezing process described above, an apparatus comprising a mixer-crusher for effecting mixing and crushing of the feedstock, namely, the material to be processed and dry ice, equipped with a feedstock supplying means and a means for taking out the frozen product may be employed. Any arrangement may be enough to use as the mixer-crusher, so long as it permits mixing and crushing of the raw material together with dry ice. The strength of the material against crushing may vary for each specific material and any voluntary equipment adaptable to each specific material to be processed can widely be employed therefor, such as crushers, mills, extruders, mixers and presses. Also, as to the mechanism for effecting crushing, any voluntary system can be employed, such as a rotary blade type, screw type and ram type (compression).

Preferred examples of the mixer-crusher include one in which a screw extruder, a cutter means and a die are combined, as commonly employed in a meat mincer, and one in which a ram and a die are combined, as commonly used in a tabletting machine or the like. The screw extruder is designed to perform mixing and crushing of the material to be processed together with the dry ice and to convey the resulting frozen blend to the exit and comprises a screw rotatable within a cylindrical housing provided therein with a baffling means and defining therein a working chamber. The cutter means is disposed at the front end of the screw extruder in opposition to the die having extrusion passage(s) and is arranged so as to rotate together with the screw.

An arrangement in which a ram and a die are combined to cooperate, as employed in a tabletting machine or the like, is also preferred. This arrangement operates in such a manner that the ram is reciprocated towards and astern the die within the work chamber to which the material to be processed and dry ice are supplied, whereby they are crushed and mixed to build up a frozen blend therein. The die may or may not have passage(s) for extruding the frozen blend. If the die has no passage(s), the mixer-crusher is constructed in a form similar to a tabletting machine to produce a compacted disk-like block of the frozen blend. If the die is provided with passage(s) for discharging the frozen blend therethrough, the mixer-crusher is a designed to extrude the frozen product through the passage(s) in a crushed form. When a rectangular opening is disposed in the side wall of the housing or aside the die, the frozen product may be extruded therethrough in a belt-like form by pressing the frozen blend under a sufficient pressure, so long as the frozen product has an adequate consistency permitting the extrusion.

When the material to be processed and dry ice are supplied from the feedstock supplying means to the mixer-crusher, the material and dry ice are crushed and mixed therein to form a frozen blend which is taken out by the means for taking out the frozen blend. In the mixer-crusher comprising a screw extruder combined with a cutter means and a die, the feedstock, i.e. the material to be processed and dry ice, is crushed and mixed while passing through the screw and is frozen to form a frozen blend which is then further subjected to the mixing and crushing action of the cutter means under cooperation with the die at the front end of the extruder, before it is extruded through the passage(s) of the die.

In the mixer-crusher comprising a press crusher having a ram and a die with no passage(s) for the frozen blend, the feedstock is compressed between the plunger ram top and the die to thereby effect crushing and mixing of the feedstock to cause it to be frozen into a frozen blend of a form of a disc or tablet. The resulting frozen blend is present as a compacted mass, though in a partly crushed state. Such a frozen blend can be taken out by lifting up the die upon retraction of the plunger ram. The pressing pressure may be in the range of 15–3,000 MPa, preferably 30–600 MPa.

In the mixer-crusher comprising a press-crusher having a ram and a die with passage(s) for extruding the frozen blend, the feedstock is compressed between the plunger ram top and the die to thereby effect crushing and mixing of the feedstock to cause it to be frozen into a frozen blend which is extruded by the compressive force, with the aid of the pressure of the liberated carbon dioxide gas, through the passage(s) in the die. The pressing pressure may be in the range of 15–3,000 MPa, preferably 30–600 MPa. If the pressure is higher than the upper limit, the resulting frozen blend may occasionally not be able to pass through the passage(s) and should be taken out in the manner as described for the mixer-crusher having a die with no passage (s). The mixer-crusher with press crusher functions based on a batch-wise operation and is not adapted for a mass-production process. However, it is suited in particular for producing a frozen product of a material having a high water-content, such as an aqueous solution or a fruit.

The freeze-drying apparatus according to the present invention is based on a combination of such a freezing apparatus with a vacuum drying apparatus for processing the frozen product obtained in the freezing apparatus as above further by a freeze-drying. Here, the frozen product take-out means in the freezing apparatus can be utilized as such for transferring the frozen blend to the vacuum drying apparatus. As the vacuum drying apparatus, one which can maintain the degree of vacuum within the above-mentioned range may be preferable.

While there is no special limitation for the practical means for attaining the vacuum in the vacuum drying apparatus, a vacuum pump may, in general, be employed. The vacuum drying apparatus may preferably be provided with a heating and/or cooling means for controlling the temperature of the material to be processed, wherein it is especially preferable to provide the apparatus with a heating means for heating the material to be processed to a temperature of 20–50° C. in order to increase the rate of sublimation and with a refrigerator capable of cooling the cooling coil in order to trap the sublimated ice at a temperature of −50° C.

In the freeze-drying apparatus, the moisture (ice) in the frozen product sublimates in the high vacuum, whereby a freeze-dried product is obtained.

In summary, according to the present invention, it is made possible to attain the freezing of the material to be processed in a crushed and homogenized form while preserving the original quality and properties of the material without suffering from any denaturing of the material due to the action of existing enzymes, the presence of oxygen, heat and so on, by simple operations in a simple apparatus, by crushing and mixing the material together with dry ice while replacing the surrounding atmosphere by the thereby liberated carbon dioxide gas.

The frozen product according to the present invention is present in a state which is inert to external influences while preserving the intrinsic quality and properties of the original material without suffering from any denaturing due to the existing enzymes, oxygen and heat and can be stored, transported or served for final use after being thawed.

The process and the apparatus for freeze-drying according to the present invention provide for a technique in which the material to be processed and dry ice are crushed and mixed while replacing the surrounding atmosphere by the thereby liberated carbon dioxide gas while simultaneously attaining the freezing of the material and, then, the resulting frozen product is subjected to vacuum-drying, whereby the material can be freeze-dried while preserving the intrinsic quality and properties of the original material in a crushed and homogenized state without suffering from any denaturing of the material due to the existing enzymes, oxygen and heat, wherein the time for attaining the freeze-drying can also be reduced.

The freeze-dried product according to the present invention is inert to external influences and preserves the intrinsic quality and properties of the original material without suffering from any denaturing due to the existing enzymes, oxygen and heat and can be stored, transported and served as such for final uses, so that it has applications for foods, drugs, fodders and so and exhibits high functional performances.

THE BEST MODE FOR EMBODYING THE INVENTION

Below, the present invention will be described with reference to the appended Drawings.

Figure 2:
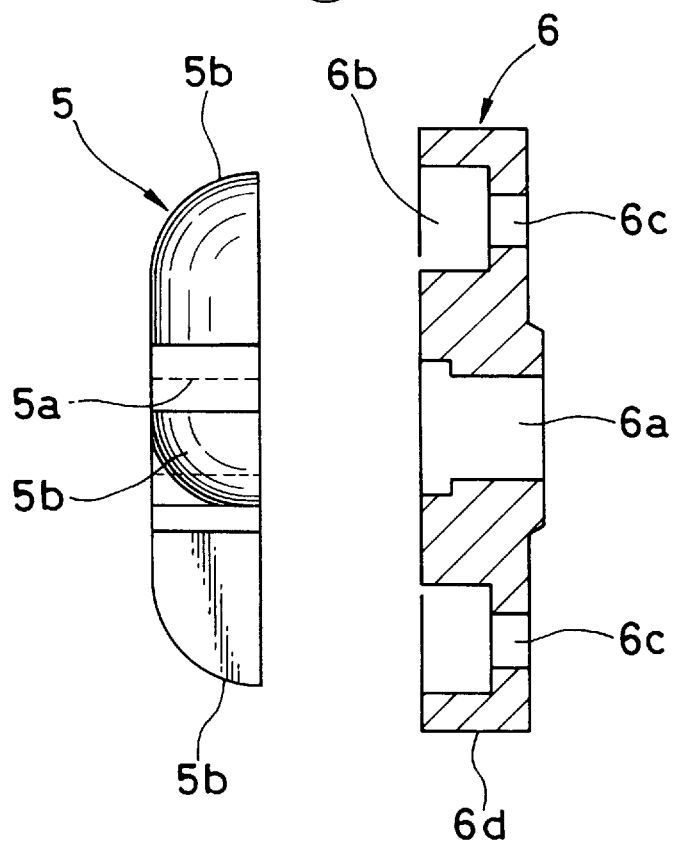
FIG. 2 shows a cutter means and a die to be installed in the apparatus given in FIG. 1, in a side and a sectional view, respectively.

In FIG. 1, an embodiment of an apparatus according to the present invention is illustrated by an exploded perspective view. In FIG. 2, the cutter means and the die cooperating therewith for the apparatus of FIG. 1 are shown in a front view and in a sectional view, respectively.

In the apparatus shown in FIG. 1, the freezing apparatus 1 is composed of a mixer-crusher 10, a feedstock supplying means 11 and a frozen product take-out means 12, wherein the mixer-crusher 10 comprises a cylinder 3 defining therein a working chamber and provided on the internal periphery with a baffling means 2, a screw 4 disposed rotatably within the cylinder 3, a cutter means 5 disposed at the front end of the screw, a die 6 and a holding collar 7.

The cylinder 3 is designed in a hollow tubular form and is provided at its one end with a driving electric motor 9 with a reduction gear 8. The assembly accommodated in the cylinder 3 is mounted on a stand 15. It is enough for the baffling means 2 to arrange it so as to provide a resistance to the movement of the crushed mass within the work chamber caused by the rotation of the screw 4, wherein the orientation of the baffling means not only be in the axial direction but also in another direction, e.g. parallel to the orientation of the screw thread 4a or reverse thereto.

The shaft 13 of the screw 4 is connected to the reduction gear 8. Within the rotary shaft 13 there is arranged a rotary shaft 14 for effecting rotation of the cutter means. The rotary shaft 13 is in engagement with the central hole 5a of the cutter means 5 and is connected at the other end with the reduction gear 8. The shafts 13 and 14 are connected to the reduction gear 8 in such a manner that their revolution rates are different from each other. The cutter means 5 shown is constituted of a rotary blade cutter having four blunt blades 5b extending radially outward.

The die 6 has a configuration of an essentially flat disc having a central bearing hole 6a for bearing the shaft 14 so as to permit its free rotation therein and is provided with four grooves 6b extending along a circle and being open to the inside of the cylinder and each having a cut off hole 6c (passage) in an arcuate segment along the groove for serving as the extrusion passage for the frozen product. On the peripheral side face of the die 6, a cut-in groove 6d is formed, in which an engagement ridge 3a formed on the inside face of the cylinder 3 at the front end can fit for a solid engagement upon assemblage of the mixer-crusher. The holding collar 7 has an inside screw thread 7a which can mate with the outer screw 3b formed on the outer circumferential face of the cylinder 3 at its front end and holds the cutter means 5 and the die 6 positioned on the rotary shaft 14 in the cylinder 3 when mounted by screwing on the cylinder.

The feedstock supplying means 11 is composed of a feedstock hopper 11a and an inlet throat 11b a connected to the cylinder 3 at its rear end to supply the material to be processed and dry ice to the mixer-crusher 10. The frozen product take-out means 12 is adapted to collect the frozen product extruded out through the passages 6c and take it out of the apparatus, specific illustration of which is omitted.

The freezing apparatus described above operates in such a way that the feedstock, i.e. the material to be processed and dry ice, is fed to the feedstock hopper 11a in a mixed state and is then guided into the mixer-crusher 10 via the inlet throat 11b. By actuating the motor 9, the screw 4 and the cutter means 5 are rotated via the shaft 13 and the rotary shaft 14 by the reduction gear 8. Here, the rate of revolution of the cutter means can be settled to be greater than that of the screw 4. The revolution rate of the screw 4 may be in the range of 10–120 r.p.m. and that of the cutter means 5 may be in the range of 10–120 r.p.m.

By the rotation of the screw 4, the feedstock mixture, i.e. the material to be processed and dry ice, charged in the work chamber inside the cylinder 3 is driven to move towards the front end of the screw 4. Here however, such movement of the feedstock mixture is obstructed by the baffling means 2 whereby shearing forces are brought about in the mass of the feedstock mixture which cause the lumps of dry ice and the material to be crushed and mixed together, resulting in freezing of the material. This mixing process is repeated on the way to the screw front end to thereby achieve finer and disintegration of the lumps until the crushed and mixed mass is finally crushed and mixed at the front end of the screw by the rotary cutter 5 and homogenized.

The cutter means 5 rotates under a condition substantially contacting with the inside face of the die 6. By the design of the cutter means 5 as a rotary blade cutter having blunt cutting blades 5b having blunt edge of nearly right angles and extending radially outward and by the arrangement of grooves along a circle on the inside face of the die 6 so as to provide a space between the cutter contacting face and the passage 6c, the resulting frozen product can easily be extruded without causing clogging of the passage 6c. The particle size of the frozen product obtained can be adjusted adequately by exchanging the die 6 for another one prepared preliminarily which has an adequate design for the opening of the passage 6c, for the space between the passage 6c and the rotary blade 5b (namely, the depth of the groove 6c) and for others.

The frozen product extruded out through the passage 6c is taken out of the apparatus by the frozen product take-out means 12 and is stored, transported or served as such for final use.

In the apparatus described above, the screw 4 and the cutter means 5 may preferably be operated so as to change the rotational direction, i.e. in reverse, sometimes, in order to prevent adhesion or sticking of the frozen product onto the baffling means 2 or onto the screw 4.

Figure 3:
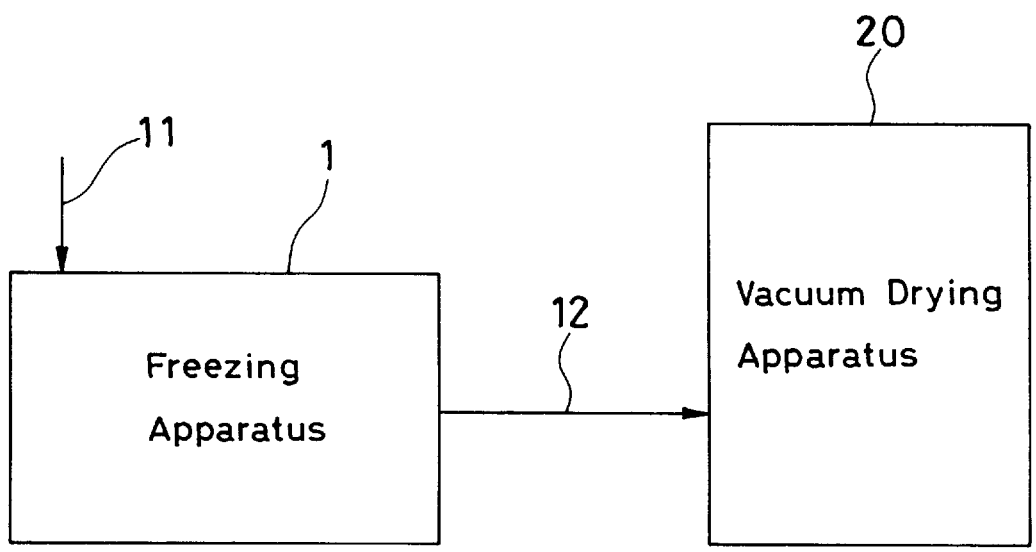
FIG. 3 is an explanatory diagram for the conceptional construction of a freeze-drying apparatus according to the present invention.

FIG. 3 shows the construction of a freeze-drying apparatus according to the present invention in which the freezing apparatus 1 constructed as shown in FIG. 1 is combined with a vacuum drying apparatus 20 through the frozen product take-out means 12. As the vacuum drying apparatus, one which operates so as to attain drying of the material to be processed under vacuum by the of ice from the frozen material can be employed. A commercial apparatus equipped with a heating means for heating the material to be processed to 20–30° C. to increase the sublimation rate and with a cooling means for cooling the cooling coil for trapping the sublimated ice at −50° C. may be employed therefor.

In the above freeze-drying apparatus, the frozen product obtained in the freezing apparatus 1 is transferred to the vacuum drying apparatus 20 using the frozen product take-out means 12 to subject it to a vacuum drying by holding it under a vacuum. Here, the vacuum drying proceeds first by the sublimation of dry ice leaving behind a porous frozen mass and, then, sublimation of ice occurs from such a porous frozen mass having a large surface area, so that the vacuum drying can be effected promptly. Thus, a frozen material requiring about 7 days for attaining vacuum drying in a usual manner may be vacuum-dried by the precess according to the present invention within about 2 days. While the procedures of taking the product into and out of the vacuum drying apparatus 20 are realized in general in a batch-wise operation, it is possible to carry out these procedures in a continuous mode by providing transport lines kept under exclusion of intrusion of air.

Figure 4:
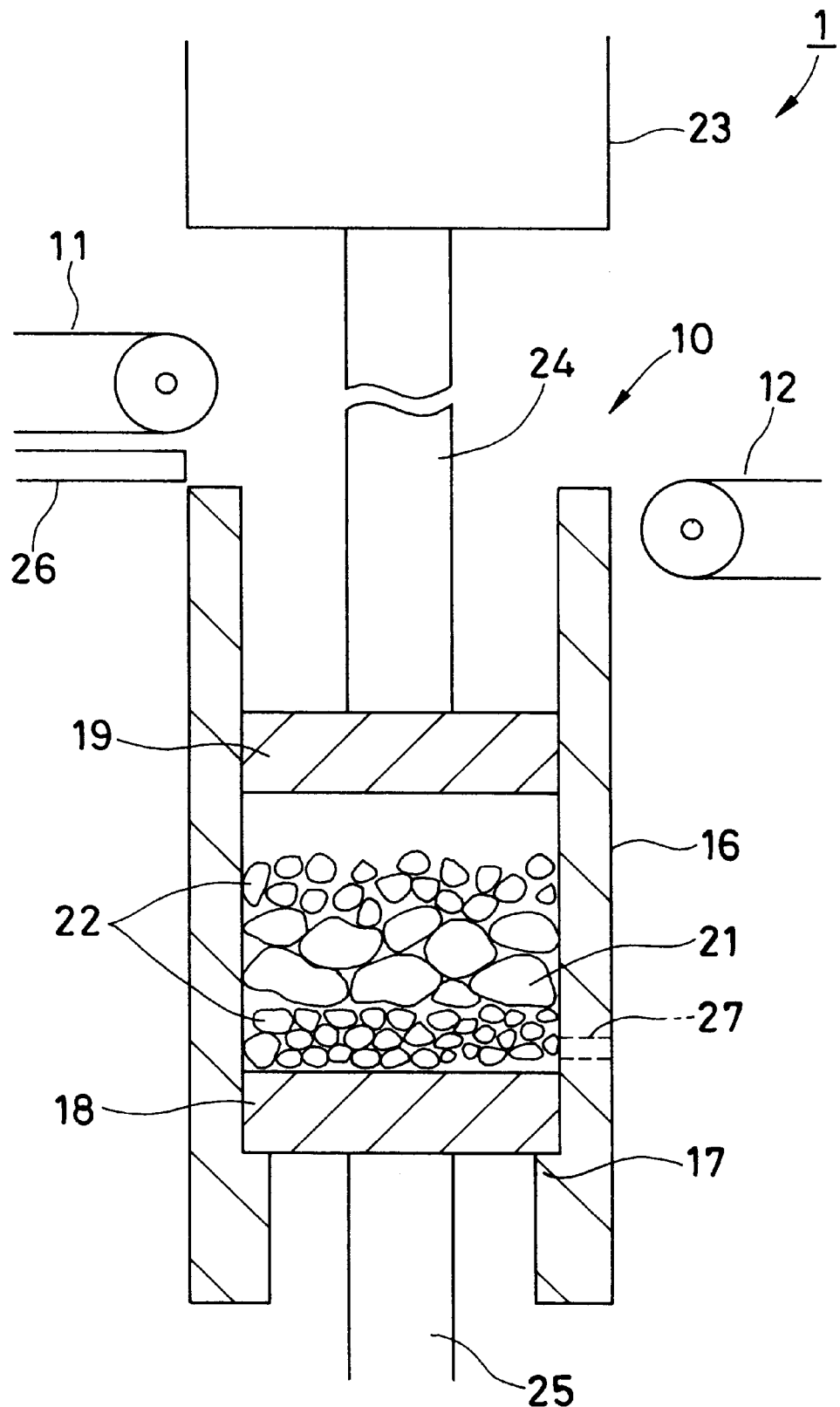
FIG. 4 shows another embodiment of a freezing apparatus according to the present invention in a vertical sectional view.

FIG. 4 shows another embodiment of the mixer-crusher 10 in a form of press-crusher.

The mixer-crusher 10 of FIG. 4 comprises a ram-die press-crusher (18, 19) operable within a cylindrical casing 16 defining a working chamber therein, wherein the material to be processed 21 is supplied to the working chamber in a form sandwiched between layers of granular dry ice 22 and is pressed therein by a ram top 19 operable to reciprocate therein towards and away from a solid die 18 by means of a ram rod 24 extending from a hydraulic cylinder 23, wherby the material is crushed and mixed with finely disintegrated dry ice particles so as to attain instantaneous freezing under replacement of the surrounding atmosphere by the liberated carbon dioxide gas. The die 18 is arranged so as to permit it to be lifted up by a piston 25. Belt conveyers 11 and 12 are used for supplying the feedstock and for taking out the frozen product to and from the working chamber, respectively. The frozen product lifted up from the mixer-crusher 10 is pushed aside onto the belt conveyer 12 by forwarding a sweeping member 26.

In the above freezing apparatus, dry ice 22 is first supplied to the mixer-crusher 10 using the feedstock supplying means 11 when the ram rod 24 is retracted by operating the hydraulic cylinder 23 and, then, by protruding the ram rod, the pre-charged layer of dry ice 22 is pressed and crushed between the ram top 19 and the die 18 into finer particles, whereupon the working chamber is again caused to open and thereto is supplied the material to be processed 21 so as to pile it over the crushed dry ice layer and then a further layer of dry ice placed thereon to sandwich the layer of the material 21 by the dry ice layers, before the working chamber is once again closed by extending the ram rod and the sandwiched mass is pressed between the ram top 19 and the die 18 to attain crushing and mixing of the material with dry ice. In the resulting frozen product, the processed material may be present as a partly crushed but partly joined mass in the product of a tablet- or disc-like form, resulting from the shearing action induced upon pressing the crushed dry ice particles 22 onto the material 21. The frozen product can be taken out from the working chamber by lifting up the piston 25 while retracting ram rod 24 and forwarding the sweeping member 26, after the chamber is opened.

A material to be processed which becomes fluid upon pressing under a high pressure can be extruded from the working chamber through an extrusion slit 27 disposed in the casing 16, as a corresponding sheet or ribbon when such a material is compressed together with dry ice between the ram top and the die, which solidifies at once upon being extruded, whereby a frozen product in a form of plate or band can thus be obtained.

FIG. 5 shows a further embodiment of the mixer-crusher 10 also in a form of press-crusher, in which the corresponding parts and members as those of FIG. 4 are designated by the same identification numerals as in FIG. 4.

In this mixer-crusher 10, the die 18 is supported on a support 17 fixedly and is provided with a plurality of frozen product extrusion passages 18a. A screw conveyer is arranged as the frozen product take-out means 12 in the support beneath the die 18. A sweeping member 26 is not provided. Other constructions are the same as in FIG. 4.

In the above freezing apparatus, the material to be processed 21 and dry ice 22 are supplied to the working chamber using the feedstock supplying means 11 when the chamber is open in the same manner as in the apparatus of FIG. 4. On pressing the charged feedstock between the ram top 19 and the die 18, lumps of dry ice 22 and the material 21 are crushed and mixed together to build up a frozen blend, which is extruded through the passages 18a by the pressure imparted by the ram top 19 and by the pressure of carbon dioxide gas liberated by the crushing and mixing action from the dry ice. The resulting frozen product is taken out of the apparatus by the take-out means 12 (screw conveyer). The resulting frozen product is in a form similar to that of the apparatus with the screw extruder of FIG. 1.

EXAMPLES

Below, the present invention will further be detailed by way of Examples.

Examples 1 to 3

Using a freezing apparatus corresponding to that shown in FIG. 1 (with an outer diameter of the die 6 of 70 mm), a sweet potato (Beniazuma) in Example 1, a sweet potato (Healthy Red) in Example 2 and fruit of a true citron in Example 3 were processed by freezing. In the practical operation of freezing, 1 kg of dry ice square pieces of 2 cm size per 1 kg of the material to be processed was fed to the feedstock hopper 11a and the screw 4 was driven at a rate of revolution of 120 r.p.m. under rotation of the cutter 5 at 120 r.p.m. to effect crushing and mixing of the material and dry ice, whereby each frozen product was obtained.

Then, the so-obtained frozen product was transferred to a vacuum drying apparatus, in which it was vacuum-dried at a degree of vacuum of $20 \times 10^{-8}$ a Bar, at a drying shell temperature of 20° C. for 48 hours to obtain a freeze-dried product.

Comparative Examples 1–3

The procedures of Examples 1–3 were pursued with the exception that crushing and mixing of the material to be processed was effected in a usual manner at a normal temperature without using dry ice, followed by a preliminary freezing of the resulting crushed blend at −50° C. in a vacuum freezing apparatus, before it was vacuum-dried to obtain a freeze-dried product.

The resulting freeze-dried products of Examples 1–3 and of Comparative Example 1–3 were examined for the color tone by L* (lightness), a* (red-green) and b* (yellow-blue) using a color chromacity meter (CR-300 of Minolta Camera Co., Ltd.) according to JIS Z 8722, 45-0. The results are recited in Table 1.

TABLE 1

| | Sample | | Examples | Compar. Examples |
|---|---|---|---|---|
| 1 | Beniazuma | L* | 88.2 | 46.9 |
| | | a* | 4.1 | 7.7 |
| | | b* | 20.7 | 18.8 |
| 2 | Healthy Red | L* | 91.5 | 45.9 |
| | | a* | −3.3 | 9.3 |
| | | b* | 27.03 | 20.3 |
| 3 | True citron | L* | 81.9 | 77.7 |
| | | a* | −1.6 | 0.1 |
| | | b* | 41.9 | 18.6 |

As seen from Table 1, the products of inventive Examples 1–3 exhibited higher lightness values (L*) together with color tones close to those of the original materials. In contrast, the products of Comparative Examples 1–3 exhibited far lower lightness values and, in particular, the products of Comparative Examples 1 and 2 had revealed a browning, indicating a denaturing due to the oxidation of polyphenols and the like. In addition, it is to be pointed out that the products of the inventive Examples, in particular, of Example 3 emitted a favorable flavor close to that of the original fresh fruit, whereas the products of the Comparative Examples were inferior in the odor.

In Table 2, the results of detection of bacteria for the products of the inventive Examples are recited.

TABLE 2

| Number of Bacteria (cells/g)* | | | |
|---|---|---|---|
| Material processed | Bacteria of common sp. | *Escherichia coli* | Fungi, Yeast |
| Beniazuma | 120 | 0 | negative |
| Healthy Red | 110 | 0 | negative |

TABLE 2-continued

| | Number of Bacteria (cells/g)* | | |
|---|---|---|---|
| Material processed | Bacteria of common sp. | *Escherichia coli* | Fungi, Yeast |
| True citron | 60 | 0 | negative |

*): Detection was carried out by a standard agar medium method for the bacteria of common species, by the RGLB method for *Escherichia coli* and by the potato-dextrose medium method for fungi and yeast.

What is claimed is:

1. A process for producing a freeze-dried product comprising the steps of:

mixing a material to be processed with dry ice to thereby attain freezing of the material substantially instantaneously and form a frozen blend, replacing the surrounding atmosphere by the carbon dioxide gas from the dry ice, and subjecting the frozen blend to a vacuum drying.

2. A process for producing a freeze-dried product, comprising the steps of:

mixing and crushing a material to be processed with dry ice to thereby attain freezing of the material substantially instantaneously and form a frozen blend with the dry ice, replacing the surrounding atmosphere by the carbon dioxide gas from the dry ice, and subjecting the frozen blend to a vacuum drying.

3. A freeze-dried product obtained by the process of claim 1.

4. A porous freeze-dried product obtained by the process of claim 2.

5. An apparatus for producing a freeze-dried product comprising:

a freezing unit which comprises a mixer-crusher in which a material to be processed is mixed and crushed together with dry ice to thereby attain freezing of the material substantially instantaneously and form a frozen blend containing finely disintegrated dry ice particles while the surrounding atmosphere is replaced by the carbon dioxide gas from the dry ice, a feedstock supplying means for supplying the material to be processed and dry ice to the mixer-crusher, a means for taking out the frozen blend from the mixer-crusher, and a vacuum drying unit in which the frozen blend obtained in the freezing unit is subjected to a vacuum drying.

6. An apparatus as claimed in claim 5, wherein the mixer-crusher comprises:

a cylinder provided with a baffling means and defining therein a working chamber, a screw capable of rotating within the working chamber in the cylinder and designed to mix and crush the material to be processed with dry ice and forward the frozen blend towards a discharge end of the cylinder, a rotatable cutter means disposed at a discharge end of the screw for further crushing the frozen blend before it is discharged out of the cylinder, a die with extrusion passage(s) disposed at a discharge end of the working chamber subsequent to and in cooperation with the cutter means for permitting extrusion of the frozen blend therethrough.

7. An apparatus as claimed in claim 5, wherein the mixer-crusher comprises:

a casing defining therein a working chamber, a die arranged in the casing and a ram crusher for mixing and crushing the material to be processed together with dry ice between the die and comprising a ram top which is slidable in the working chamber.

8. An apparatus as claimed in claim 5, wherein the mixer-crusher comprises:

a casing defining therein a working chamber, a die with extrusion passage(s) disposed at a discharge end of the working chamber in the casing and a ram crusher for mixing and crushing the material to be processed together with dry ice between the die and comprising a ram top which is slidable in the working chamber and extrudes the resulting frozen blend through the passage(s) of the die.

* * * * *